(12) United States Patent
Morimura

(10) Patent No.: US 11,631,030 B2
(45) Date of Patent: Apr. 18, 2023

(54) LEARNING WITH MOMENT ESTIMATION USING DIFFERENT TIME CONSTANTS

(71) Applicant: INTERNATIONAL BUSINESS MACHINES CORPORATION, Armonk, NY (US)

(72) Inventor: Tetsuro Morimura, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 422 days.

(21) Appl. No.: 16/787,443

(22) Filed: Feb. 11, 2020

(65) Prior Publication Data

US 2021/0248510 A1 Aug. 12, 2021

(51) Int. Cl.
*G06N 20/00* (2019.01)
*G06N 7/01* (2023.01)

(52) U.S. Cl.
CPC .............. *G06N 20/00* (2019.01); *G06N 7/01* (2023.01)

(58) Field of Classification Search
CPC ............................... G06N 20/00; G06N 7/005
See application file for complete search history.

(56) References Cited

U.S. PATENT DOCUMENTS

| 10,963,783 | B2 | 3/2021 | Faivishevsky et al. |
| 2019/0220748 | A1 | 7/2019 | Denil et al. |
| 2019/0220781 | A1 | 7/2019 | Vinyals et al. |
| 2019/0236482 | A1 | 8/2019 | Desjardins et al. |

FOREIGN PATENT DOCUMENTS

| CN | 108460460 A | 8/2018 |
| CN | 108601033 A | 9/2018 |
| CN | 109313721 A | 2/2019 |
| CN | 109325395 A | 2/2019 |
| CN | 109389222 A | 2/2019 |
| CN | 110134636 A | 8/2019 |

OTHER PUBLICATIONS

Kingma, D.P. and Ba, J., 2014. Adam: a method for stochastic optimization. arXiv preprint arXiv:1412.6980. (Year: 2014).*

(Continued)

*Primary Examiner* — Casey R. Garner
(74) *Attorney, Agent, or Firm* — Tutinjian & Bitetto, P.C.; Jared Chaney

(57) ABSTRACT

A technique for training a model includes obtaining a training example for a model having model parameters stored on one or more computer readable storage mediums operably coupled to the hardware processor. The training example includes an outcome and features to explain the outcome. A gradient is calculated with respect to the model parameters of the model using the training example. Two estimates of a moment of the gradient with two different time constants are computed for the same type of the moment using the gradient. Using a hardware processor, the model parameters of the model are updated using the two estimates of the moment with the two different time constants to reduce errors while calculating the at least two estimates of the moment of the gradient.

25 Claims, 6 Drawing Sheets

(56) References Cited

OTHER PUBLICATIONS

Schaul, T., Zhang, S. and LeCun, Y., May 2013, No more pesky learning rates. In International conference on machine learning (pp. 343-351). PMLR. (Year: 2013).*

Ginsburg, B., Castonguay, P., Hrinchuk, O., Kuchaiev, O., Lavrukhin, V., Leary, R., Li, J., Nguyen, H., Zhang, Y. and Cohen, J.M., 2019. Training Deep Networks with Stochastic Gradient Normalized by Layerwise Adaptive Second Moments. (Year: 2019).*

Kidambi, R., Netrapalli, P., Jain, P. and Kakade, S., Feb. 2018, on the insufficiency of existing momentum schemes for stochastic optimization. In 2018 Information Theory and Applications Workshop (ITA) (pp. 1-9). IEEE. (Year: 2018).*

Chen et al., "On the Convergence of a Class of Adam-Type Algorithms for Non-Convex Optimization", 2019 International Conference on Learning Representations . arXiv:1808.02941v2. Mar. 10, 2019. (pp. 1-30.).

Ginsburg et al., "Stochastic Gradient Methods with Layerwise Adaptive Moments for Training of Deep Networks", arXiv:1905.11286v2. Sep. 18, 2019. (pp. 1-13.).

Kingma et al., "ADAM: a Method for Stochastic Optimization", arXiv:1412.6980v9. Jan. 30, 2017. (pp. 1-15.).

Sebastian Ruder, "An overview of gradient descent optimization algorithms", arXiv:1609.04747v2. Jun. 15, 2017. (pp. 1-14.).

International Search Report issued in PCT Application No. PCT/IB2021/050895, dated May 17, 2021, pp. 1-10.

\* cited by examiner

FIG. 4

| | |
|---|---|
| 010 | Require: $r$: base step size or learning rate hyper-parameter |
| 020 | Require: $bl_1, bl_2 \in [0,1)$: decay rates for first and second order moment estimates |
| 030 | Require: $f(p)$: objective function with model parameters $p$ |
| 040 | Require: $p_0$: initial model parameters vector |
| 050 | Require: $d1, d2 > 0$: powers of changing the decay rates $bl_1, bl_2$ |
| 060 | $t \leftarrow 0$ (initialize iteration step) |
| 070 | $ml_0 \leftarrow 0$ (initialize first order moment vector for long time constant) |
| 080 | $vl_0 \leftarrow 0$ (initialize second order moment vector for long time constant) |
| 090 | $bs_1 \leftarrow bl_1^{d1}$ (set decay rate of short term time constant for first order moment estimate) |
| 100 | $bs_2 \leftarrow bl_2^{d2}$ (set decay rate of short term time constant for second order moment estimate) |
| 110 | $ms_0 \leftarrow 0$ (initialize first order moment vector for short time constant) |
| 120 | $vs_0 \leftarrow 0$ (initialize second order moment vector for short time constant) |
| 130 | while $p_t$ not converged do |
| 140 | $\quad t \leftarrow t+1$ |
| 150 | $\quad g_t \leftarrow \nabla_p f(p_{t-1})$ (get stochastic gradient of the objective function at time step $t$) |
| 160 | $\quad ml_t \leftarrow bl_1 \bullet ml_{t-1} + (1 - bl_1) \bullet g_t$ (update first order moment vector for long time constant) |
| 170 | $\quad vl_t \leftarrow bl_2 \bullet vl_{t-1} + (1 - bl_2) \bullet g_t^2$ (update second order moment vector for long time constant) |
| 180 | $\quad ms_t \leftarrow bs_1 \bullet ms_{t-1} + (1 - bs_1) \bullet g_t$ (update first order moment vector for short time constant) |
| 190 | $\quad vs_t \leftarrow bs_2 \bullet vs_{t-1} + (1 - bs_2) \bullet g_t^2$ (update second order moment vector for short time constant) |
| 200 | $\quad M_t \leftarrow 1(ml_t \circ ms_t > 0) \circ H(ml_t / (1-bl_1^t), ms_t / (1-bs_1^t))$ (compute bias corrected first order moment vector) |
| 210 | $\quad V_t \leftarrow \max(vl_t / (1-bl_2^t), vs_t / (1-bs_2^t))$ (compute bias corrected second order moment vector) |
| 220 | $\quad p_t \leftarrow p_{t-1} - r \bullet M_t / (\sqrt{V_t} - e)$ (update model parameters) |
| 230 | end while |
| 240 | return $p_t$ |

LEARNING WITH MOMENT ESTIMATION USING DIFFERENT TIME CONSTANTS

BACKGROUND

Technical Field

The present disclosure generally relates to machine learning, and more particularly, to computer-implemented methods, computer systems and computer program products for training a model based on moment estimation.

Description of the Related Art

Stochastic gradient descent (SGD) is used widely in a field of machine learning, especially online learning. If a learning rate is properly set, the learning process would be stable. However, the learning process often becomes unstable especially when trying fast learning with a large learning rate. Finding an adequate learning rate is generally difficult for large-scale tasks. There is a need for stable performance even if a large learning rate is used. There are several applications where it is more meaningful to obtain fast convergence than accuracy and therefore, fast learning is demanded. As can be appreciated, such fast learning is suitable when it is necessary to dynamically adapt to new patterns in the input.

In order to mitigate such difficulty, various techniques to adapt a learning rate have been developed, such as algorithms for first-order gradient-based optimization of stochastic objective functions, based on adaptive estimates of lower-order moments. The method computes individual adaptive learning rates for different parameters from estimates of first and second order moments of the stochastic gradients.

Even though these methods can reduce training time due to its faster convergence characteristics, however, it could still cause the learning process to diverge when a base learning rate becomes larger. Accordingly, none of the conventional technologies is adequate from the viewpoint of achieving both stable and fast learning.

SUMMARY

According to an embodiment of the present invention, a computer-implemented method for training a model includes obtaining a training example for a model with model parameters stored on one or more computer readable storage mediums operably coupled to the hardware processor, in which the training example includes an outcome and features to explain the outcome, calculating gradient with respect to the model parameters of the model using the training example, computing at least two estimates of a moment of the gradient with at least two different time constants for the same type of the moment using the gradient, and updating, using a hardware processor, the model parameters of the model using the at least two estimates of the moment with the at least two different time constants to reduce errors while calculating the at least two estimates of the moment of the gradient.

In the computer-implemented method according to the embodiment of the present invention, the risk of a big mistake in gradient estimation due to influence of the old model parameters is expected to be reduced. Both of the estimates of the moment with the different time constants are taken into account in the model parameter updates. Thereby, it allows us to perform fast learning without degrading stability of learning process.

In an embodiment, each of the model parameters may be updated with an amount determined individually by respective components of the at least two estimates of the moment of the gradient in a conservative manner. Therefore, aggressive updating of the model parameters where there is inconsistency between the at least two estimates of the moment of the gradient is restrained. Thus, the risk of mistakes in parameter update due to the aggressive updating is expected to be further reduced.

In embodiments, a first model parameter of the model may be updated by zero or small amount in response to the at least two estimates of the moment being inconsistent in a component that corresponds to the first model parameter. In response to the at least two estimates of the moment being consistent in the component corresponding to the first model parameter, the first model parameter may be updated according to a value generated by combining respective components of the at least two estimates of the moment that correspond to the first model parameter. Thereby, the update rule does not change a model parameter having uncertainty while updating model parameters having consistency between the at least two estimates of the moment appropriately. Thus, the risk of mistakes due to parameter update for an uncertain direction is expected to be reduced.

In an embodiment, a first model parameter of the model may be updated according to a maximum or a mean of components of the at least two estimates of the moment that correspond to the first model parameter. Thereby, the sensitivity of the parameter update is adjusted by taking the at least two estimates of the moment into account.

In embodiments, the moment may include a first order moment of the gradient and a second order moment of the gradient as different types. The first order moment represents average of the gradient. The second order moment scales individual learning rates for the model parameters of the model.

In an embodiment, the moment may include a first order moment of the gradient and a second order moment of the gradient as different types. A first model parameter of the model may be updated in a manner depending on inconsistency between at least two estimates of the first order moment in a component that corresponds to the first model parameter and magnitude relationship between at least two estimates of the second order moment in the component.

In embodiments, the training example may be given in a streaming manner and the model to be trained may be updated each time a new training example arrives and the model is used to predict a value of the outcome based on input features. In an application where data is given in the streaming manner, it may be needed to update the model parameters dynamically to adapt to new patterns observed in the input. In such applications, the feature of fast learning without degrading stability of the learning process plays a significant role.

In embodiments, the input features may include a plurality of elements that represent past value fluctuations of the outcome observed over a predetermined period or a plurality of elements that are related to the outcome.

In an embodiment, the gradient may be a stochastic gradient of the objective function at an iteration step. The objective function may evaluate a loss between the outcome in the training example and a prediction done by the model with current values of the model parameters from the features in the training example. The training example may include a single training example or a group of training examples.

According to another embodiment of the present invention, a computer system for training a model by executing program instructions includes one or more computer readable storage mediums for storing the program instructions and a training example for a model having model parameters and processing circuitry in communications with the memory for executing the program instructions. The processing circuitry is configured to obtain a training example for a model having model parameters from the one or more computer readable storage mediums, in which the training example includes an outcome and features to explain the outcome, calculate a gradient with respect to the model parameters of the model using the training example, compute at least two estimates of a moment of the gradient with at least two different time constants for the same type of the moment using the gradient, and update the model parameters of the model using the at least two estimates of the moment with the at least two different time constants to reduce errors while calculating the at least two estimates of the moment of the gradient.

By using the computer system according to the embodiment of the present invention, the risk of a big mistake in the gradient calculation due to influence of old model parameters before learning progress is expected to be reduced. Both of the estimates of the moment with the different time constants can be taken into account in model parameter updates. In this manner, fast learning may be performed without degrading stability of learning process.

Computer program products relating to one or more aspects of the present invention are also described and claimed herein.

Additional features and advantages are realized through the embodiments of the present invention. Other embodiments and aspects of the invention are described in detail herein and are considered a part of the claimed invention.

BRIEF DESCRIPTION OF THE DRAWINGS

The foregoing and other features and advantages of the invention are apparent from the following detailed description taken in conjunction with the accompanying drawings, in which:

FIG. 4 shows a pseudo code implementing the process for training the prediction model according to an embodiment of the present invention;

DETAILED DESCRIPTION

Hereinafter, example embodiments of the present invention will be described. It will be understood by those skilled in the art that the embodiments described below are mentioned only by way of examples and are not intended to limit the scope of the present invention.

One or more embodiments according to the present invention are directed to computer-implemented methods, computer systems and computer program products for training a prediction model, in which model parameters of the prediction model are updated in a manner based on moment estimation and parameter update techniques.

Figure 1:
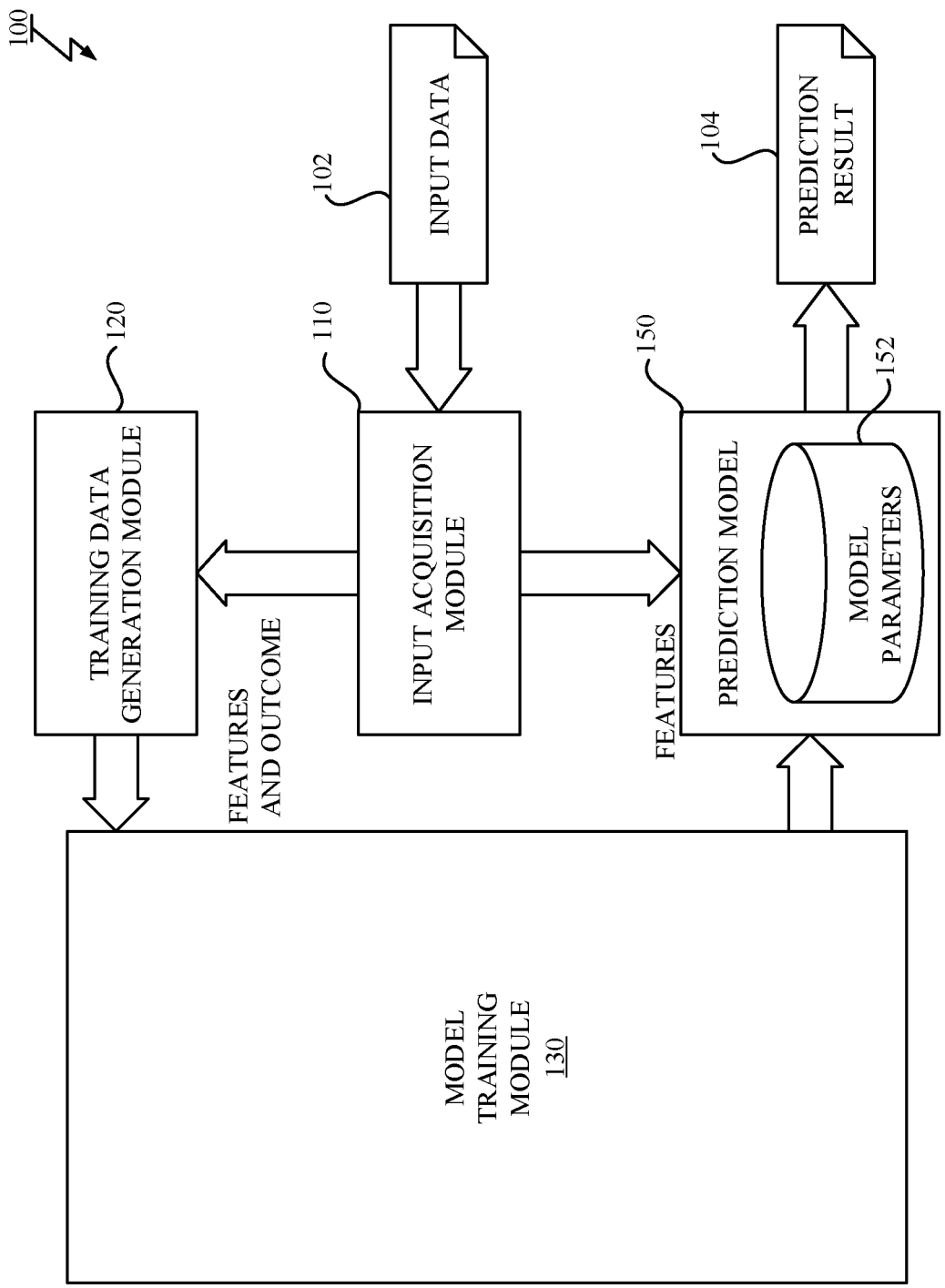
FIG. 1 illustrates a block diagram of a forecasting system including a model training module for training a prediction model according to an embodiment of the present invention.
Figure 2:
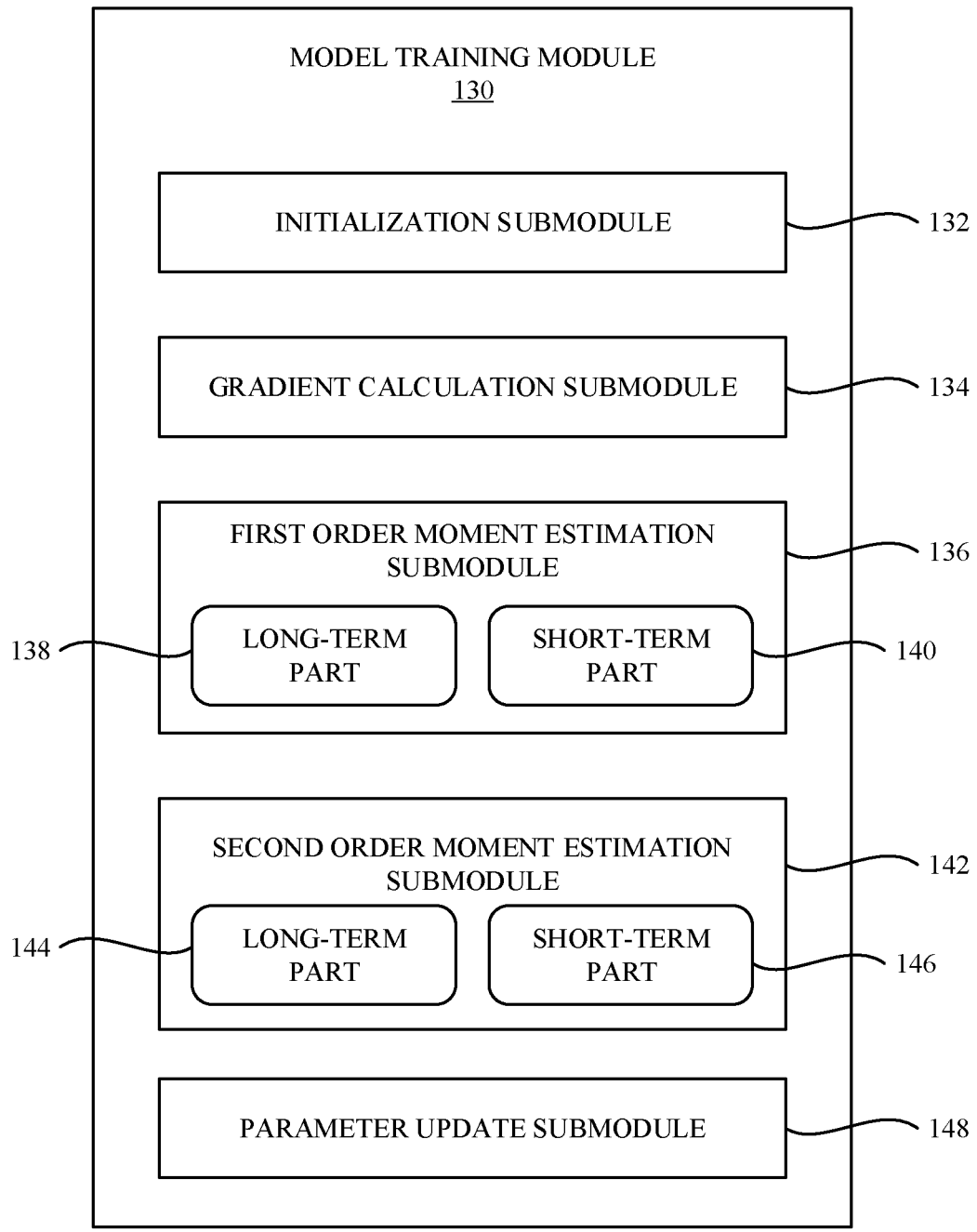
FIG. 2 shows a detailed block diagram of the model training module according to an of the present invention.
Figure 3:
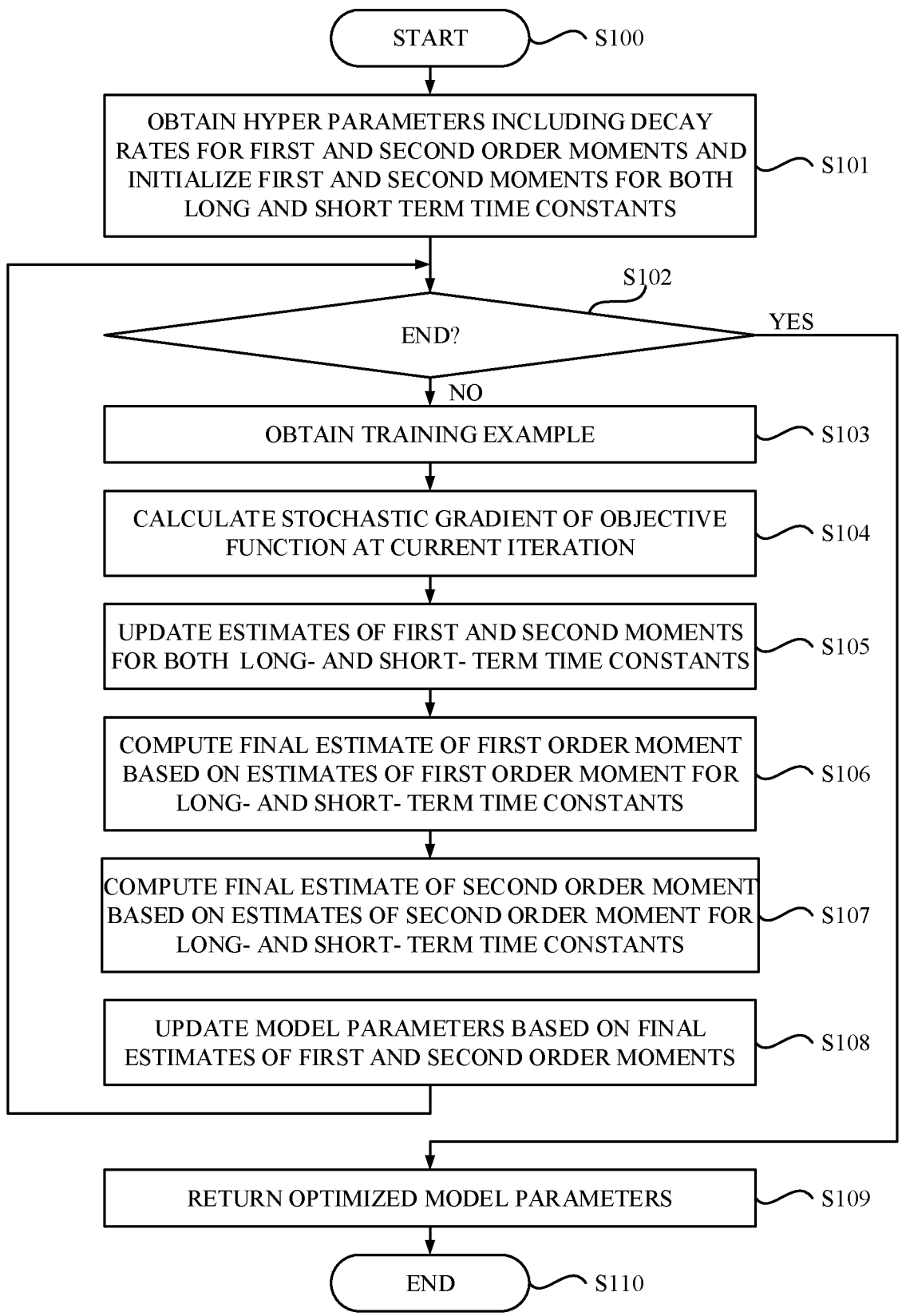
FIG. 3 is a flowchart depicting a process for training a prediction model according to an embodiment of the present invention.
Figure 5:
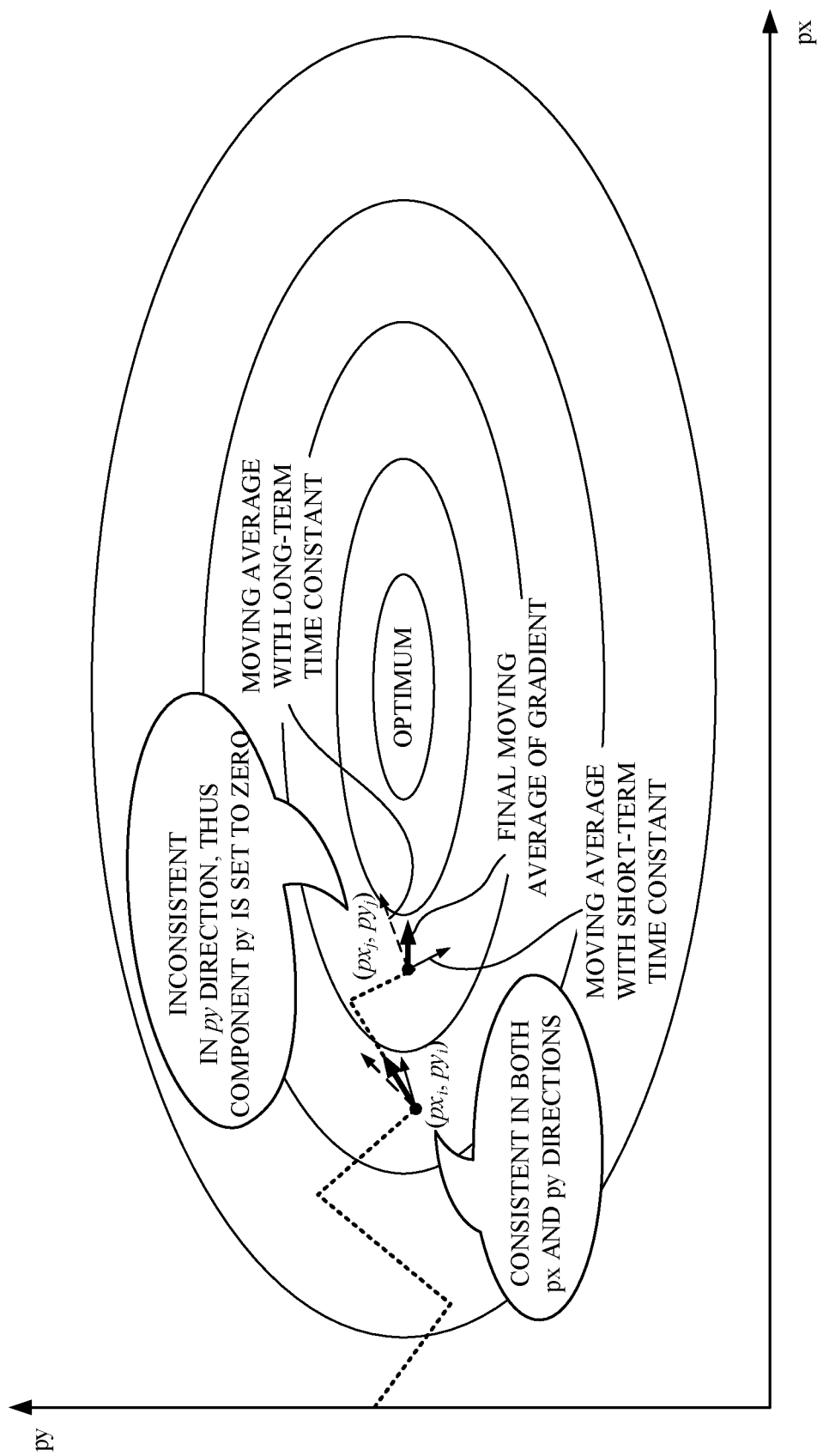
FIG. 5 shows a schematic illustrating updating model parameters using moment estimates with both long and short term time constants according to an embodiment of the present invention.

Referring initially to FIGS. 1-2, a computer system for training a prediction model that is used to forecast a future outcome from input feature according to a stochastic gradient descent (SGD) technique with novel adaptive moment estimation according to an embodiment of the present invention will be described. Referring to FIGS. 3-5, a computer-implemented method and a computer program product for training a prediction model according to a stochastic gradient descent technique with adaptive moment estimation according to an embodiment of the present invention will be described. Further, referring to FIG. 6, a hardware configuration of a computer system according to an embodiment of the present invention will be described.

With reference to FIG. 1, a block diagram of a forecasting system 100 including a model training module 130 according to an embodiment of the present invention is described. The forecasting system 100 is configured to predict a future outcome based on input data 102 that is available at a time of prediction. The outcome to be predicted may be any real-time or recorded measurable quantity that is obtained from a system, a device, a sample and/or environment without using or by using appropriate hardware, which may be a sensor that measures physical, chemical, biological or environmental parameters, or an interface device that is accessible to such information. In embodiments, the outcome may be represented by a binary number, an integer, or a real number.

Although not particularly limited, examples of the measurable quantity may include any physical quantities such as temperature, voltage, current and amount of substance, the number of objects, the number of occurrences of phenomena or events such as the number of sunspots, the existence of the objects, the occurrence of the phenomena or events, weather observations such as rainfall amounts and water levels in rivers, values of resources, and integrated values (e.g. index) evaluating any combination of the aforementioned items.

It is contemplated that the outcome may be any demand and supply, and in embodiments, may include network traffic, electric power demand or supply, a production demand of a part according to final product production, etc.

As shown in FIG. 1, the forecasting system 100 may include an input acquisition module 110 for acquiring input data 102, a training data generation module 120 for generating training data based on current and past data of the acquired input data 102, a model training module 130 for training a model based on the training data, and a prediction model 150 trained by the model training module 130.

The input acquisition module 110 is configured to acquire the input data 102. The input data 102 may be provided to the forecasting system 100 in a streaming or sequential manner and may include an observed value of the outcome itself and information that is considered to be relevant to the outcome if necessary. The input data 102 may be stored in an appropriate storage device. The actual observed value of the outcome is used as correct information (an objective variable) and may also be used as features (one or more explanatory variables) for training. If available, the information considered to be relevant to the outcome is used as features (e.g., one or more explanatory variables) for training.

The training data generation module 120 is configured to generate training data for the prediction model 150 by extracting the observed value of the outcome as the correct information and features to explain the outcome from current and past data of the acquired input data 102 that is available at the time of the prediction. Each training example in the training data includes extracted features, which may be provided in a form of a feature vector, and the extracted actual outcome observed in the past. The features may include the past values of the outcome itself and/or the information that is considered to be relevant to the outcome. In embodiments, the features may also include data obtained by processing primarily input data with other models (e.g., a sub-model).

The specific content of the training data may depend on the specific design of the prediction model 150. In embodiments where the prediction model 150 is designed to predict a future value of the outcome after a predetermined time (e.g., 6 hours) from the time of the prediction based on past value fluctuations of the outcome over a predetermined period (e.g., 24 hours), a currently observed value of the outcome is used as the correct information and past values of the outcome over the predetermined period (that ends at the point before the predetermined period from the time of the prediction, e.g., past values from 6 to 30 hours ago) are used as the features. In this manner, the feature vector of the training example includes a plurality of elements representing past fluctuations of the outcome observed over the predetermined period.

In embodiments where the prediction model 150 is designed to predict a future value of the outcome (such as a demand for a predetermined time from now) based on related information, a currently observed value of the outcome (actual demand from the predetermined time before to the present) is used as the correct information and currently available related information is used as the features. The currently available related information includes information that is considered to be relevant to the outcome. The currently available related information may also include a past value or values of the outcome itself. In one non-limiting embodiment, the feature vector includes a plurality of elements related to the outcome.

In the case where the outcome is the electric power demand, it is contemplated that the future electric power demand is considered to be relevant to a past demand itself as well as other environmental parameters including the day of the week, the season, the weather, the highest and lowest temperatures (a forecast value or an actual value), etc. Therefore, the observed value of the electric power demand and such environmental parameters may be used as the features.

The model training module 130 is configured to train the prediction model 150 in a manner based on the novel moment estimation and parameter update techniques. The prediction model 150 has model parameters 152 that are tuned by the model training module 130. It is envisioned that training of the prediction model 150 may be based upon the stochastic gradient descent (SGD) with the adaptive moment estimation, described herein. In one non-limiting embodiment, the prediction model 150, and more specifically, the model parameters 152, are updated each time a new training example arrives (becomes available). As can be appreciated, training of the prediction model 150 may be considered to be online learning.

The prediction model 150 is configured to predict a future value of the outcome based on input features and output the forecast as the prediction result 104. The input acquisition module 110 also inputs features to the prediction model 150 based on the acquired input data 102. The specific content of the input features may depend on the specific content of the training data and the specific design of the prediction model 150. In one non-limiting embodiment, the latest values of the outcome over the predetermined period are used as the features. It is contemplated that currently observed information that is considered to be relevant to the outcome, such as the day of the week, the season, the weather, the highest and lowest temperatures may be used as the input features. As can be appreciated, term "future," as used herein, indicated that the target of the prediction is outside the time range of the input features.

Since the training process is based on SGD, it is envisioned that the prediction model 150 may be based on any architecture among the variety of models that is capable of being trained by standard SGDs. Examples of architecture of the prediction model 150 includes, but is not limited to, logistic regression, support vector machines (SVMs), regression analysis such as linear regression, graphical models, artificial neural networks (ANNs) such as DNNs (Deep Neural Networks), RNNs (Recurrent Neural Networks), LSTM (Long term and short term memory), CNN (Convolutional Neural Networks), amongst others.

In one non-limiting embodiment, the prediction model 150 is generally described to be a regression mode that predicts the future value of the outcome based on the input features given in a streaming manner (e.g., real-time forecasting). In embodiments, the moment estimation and parameter update technique is applied to such task where it is necessary to dynamically adapt to new patterns in the input, and hence parameters are frequently updated. However, the prediction model 150 is not limited to the regression model and the target of the prediction model 150 is not limited to the future value of the outcome. In embodiments, the prediction model 150 may be a classification model that predicts a category or class to which an observation characterized by the input features falls. It is envisioned that the classification model may be a binary classification model or a multiclass classification model that may be implemented by combining plural binary classification models and outputs values of multiple outcomes. As can be appreciated, the prediction is not limited to real-time forecasting. In embodiments, the entire training dataset may be provided in advance. Even though the entire training dataset is available before learning, the model parameters are updated iteratively by using a single training example or a group of training examples that is/are randomly picked up from the entire training dataset.

Referring to FIG. 2, a detailed block diagram of the model training module 130 is described. The model training module 130 includes an initialization submodule 132 for initializing a setting for the training of the prediction model 150, a gradient calculation submodule 134 for calculating stochastic gradient of the objective function with respect to the parameters of the training prediction model 150 using a single training example or a group of training examples (mini-batch) of the training data, moment estimation submodules 136, 142 for adaptive moment estimation for parameter updates, and a parameter update submodule 148 for updating the model parameters 152 of the prediction model 150 in a manner based on the moment estimates.

The initialization submodule 132 is configured to initialize hyper parameters, the model parameters 152 of the prediction model 150, and estimates of low-order moments of the stochastic gradient used for parameter updates. The hyper parameters may be set to predetermined values or default values, which may be determined empirically or optimized by any known parameter optimization method such as Bayesian optimization, grid search, etc. The hyper parameters may include a base step size for providing a base learning rate adaptation and a base exponential decay rate for moment estimation. In embodiments, the hyper parameters include a factor (e.g., a power or exponent) for changing the base exponential decay rate into an additional exponential decay rate for additional moment estimation with a different time constant or the additional exponential decay rate itself. It is contemplated that the initial model parameters may be set to random values near zero and the estimates of the low-order moments may be initialized to zero.

The gradient calculation submodule 134 is configured to calculate the stochastic gradient of the objective function with respect to the model parameters 152 of the prediction model 150 using a single training example or a group of training examples (e.g., a mini-batch) of the given training data. As can be appreciated, although the term "stochastic" generally means a process that is linked with a random probability, it is not necessary to meet the Independent and Identically Distributed (I.I.D.) requirement. The "stochastic" gradient, as used herein, means that an estimate of the gradient of the objective function is calculated from a part of the training dataset instead of the entire dataset. The objective function evaluates a loss between the outcome in the training example(s) and a prediction that is given by the prediction model 150 with current values of the model parameters 152 from the features in the training example(s).

The moment estimation submodules 136, 142 are configured to compute estimates of the moment of the stochastic gradient with different time constants using the stochastic gradient calculated by the gradient calculation submodule 134. As used herein, the time constant for moment estimation is defined as an amount of time for a smoothed response to reach a predetermined value $(1-e^{-1})$ of the original value. The moment to be estimated may include one moment or a plurality of moments. When there is a plurality of moments to be estimated, different time constants are given for each moment of the same type.

In embodiments, the moment to be estimated includes a first order moment of the stochastic gradient and a second order moment of the stochastic gradient. As can be appreciated, the n-th moment of a variable is defined as the expected value of the variable to the power of n. The first order moment represents an average or mean of the stochastic gradient and relates to cumulative velocity. The second order moment represents an average of the squared stochastic gradient or (uncentered) variance of the stochastic gradient and serves to scale individual learning rates for the model parameters 152 of the prediction model 150 and relates to sensitivity. Thus, there are two moment estimation submodules including a first order moment estimation submodule 136 and a second order moment estimation submodule 142.

The first order moment estimation submodule 136 is configured to compute plural estimates of the first order moment of the stochastic gradient with different time constants using the stochastic gradient. In one non-limiting embodiment, the number of estimates and the number of time constants is two. Hence, the first order moment estimation submodule 136 includes a long-term part 138 for calculating an estimate of the first order moment of the stochastic gradient for a long-term time constant and a short-term part 140 for calculating an estimate of the first order moment for a short term time constant.

The second order moment estimation submodule 142 is configured to compute plural estimates of the second order moment of the stochastic gradient with different time constants using the stochastic gradient. In this manner, the second order moment estimation submodule 142 includes a long-term part 144 for calculating an estimate of the second order moment for long-term time constant and a short-term part 146 for calculating an estimate of the second order moment of the stochastic gradient for a short term time constant. The time constants for the second order moment may be or may not be equal to the time constants for the first order moment.

In embodiments, two estimates at two different time constants are obtained for each of the first and second order moments, and four estimates are obtained in total. The number of the estimates and the number of the time constants for each type of the moment are set to two to minimize the difficulty of adjusting the hyper parameters. However, it is contemplated that the use of three or more time constants for each type of the moment may be utilized. Furthermore, the number of estimates and the number of time constants for one type of moment may be or may not be equal to the number of estimates and the number of time constants for other type of moment.

The parameter update submodule 148 is configured to update the model parameters 152 of the prediction model 150 using the total of the four estimates of the first and second order moments with the two different time constants. Each of the model parameters 152 is updated with an amount determined individually by corresponding components of the estimates of the moments of the stochastic gradient in a conservative manner. As can be appreciated, the stochastic gradient or the moment of the stochastic gradient may be calculated as a vector with respective elements corresponding to the model parameters 152 of the prediction model 150.

In one non-limiting embodiment, each parameter in the model parameters 152 is updated in a manner depending on inconsistency between two estimates of the first order moment in a corresponding component and magnitude relationship between the two estimates of the second order moment in the corresponding component. Updating the model parameters 152 of the prediction model 150 using the plural estimates of the first and second order moments will be described in further detail hereinbelow.

In embodiments, calculating of the stochastic gradient by the gradient calculation submodule 134, computing the estimates of the first and second order moments with different time constants by the first and second order moment estimation submodules 136, 142, and updating the model parameters 152 by the parameter update submodule 148 are iteratively performed each time a new training example arrives.

It is contemplated that each of the aforementioned modules 110, 120, 130, and 150 illustrated in FIG. 1 and each of the aforementioned submodules 132, 134, 136, 138, 140, 142, 144, 146, and 148 of the model training module 130 illustrated in FIG. 2 may be implemented as a software module including program instructions and/or data structures in conjunction with hardware components such as a processor, a memory, etc., as a hardware module including electronic circuitry, or combinations thereof. It is envisioned that modules 110, 120, 130, and 150 shown in FIG. 1 and the submodules 132, 134, 136, 138, 140, 142, 144, 146, and 148 shown in FIG. 2 may be implemented on a single computer device such as a personal computer and a server machine or over a plurality of devices in a distributed manner such as a cluster of computing nodes, client-server systems, and edge computing systems, cloud computing systems, etc.

In embodiments, the input data 102 and the model parameters 152 may be stored in an appropriate internal or external storage device or medium, to which the processing circuitry of the computer system implementing the model training module 130 is operatively coupled. The prediction result 104 generated by the prediction model 150 with current values of the model parameters 152 may be stored in the appropriate internal or external storage device or medium, or output in any form from a device, which may include a display device, a speaker, an alarm, a light indicator, a printer, an network adapter, an interface device connected to a subsequent system, etc.

Referring now to FIGS. 3-5, a process for training a prediction model 150 according to an exemplary embodiment of the present invention is described.

FIG. 3 is a flowchart depicting the process for training the prediction model 150. FIG. 4 shows a pseudo code implementing the process for training the prediction model 150. It is contemplated that the process shown in FIGS. 3-4 may be performed by processing circuitry such as a processing unit of a computer system that implements at least the model training module 130 shown in FIG. 1 and its submodules shown in FIG. 2.

In embodiments, the process shown in FIG. 3 begins at step S100 in response to a request for initiating a training process of a prediction model 150 from an operator or in response to the forecasting system 100 being started up, for example.

At step S101, the processing unit may obtain hyper parameters including the decay rates for the first and second order moments and initialize the estimates of the first and second order moments for both short and long-term time constants. The model parameters 152 are also initialized with appropriate initial values (e.g. random values near zero), which may depend on the architecture of the prediction model 150.

In the pseudo code shown in FIG. 4, lines 010-120 correspond to the parameter and variable initialization at step S101. In the pseudo code, r represents a base step size or a base learning rate hyper parameter. $bl_1$ and $bl_2$, each of which is included in an interval [0,1), represent exponential decay rates for the first and second order moments with base time constants. $p_t$ represents model parameters of the prediction model G (x; p) at a current iteration step t where x denotes an input feature vector and p denotes a model parameter vector. Thus, $p_0$ denotes an initial model parameter vector of the prediction model G (at t=0). $f$ (p) is an objective function with the model parameter vector p. The objective function may be a loss function $\{y-G(x; p)\}^2$ where y denotes an observed outcome in one training example and G (x; p) outputs a predicted outcome given an input feature vector x in the training example.

The objective function $f$ (p) is differentiable or sub-differentiable with respect to the model parameters p. However, any function that is at least numerically differentiable by any known library may also be applicable as the objective function.

d1, d2, each of which is a positive real number (d1, d2>0), represent powers for changing the base exponential decay rates $bl_1$, $bl_2$ to additional exponential decay rates $bs_1$, $bs_2$ for additional moment estimation with different time constant (referred to as an additional time constant). In one non-limiting embodiment, d1 and d2 give additional exponential decay rates $bs_1$, $bs_2$ as the d1-th and d2-th powers of $bl_1$ and $bl_2$ respectively, as shown at lines 090-100 in the pseudo code shown in FIG. 4. When d1, d2>1, the base exponential decay rates $bl_1$, $bl_2$ represent rates for a long-term time constant (i.e., the base time constant is larger) whereas the additional exponential decay rates $bs_1$ ($=bl_1^{d1}$), $bs_2$($=bl_2^{d2}$) represent rates for a short-term time constant (i.e., the additional time constant is smaller). Instead of specifying the factors d1, d2 for changing the base time constant to the additional time constant, the additional exponential decay rates $bs_1$, $bs_2$ themselves may be designated directly.

$ml_t$ represents an estimate of the first order moment for the base time constant at the iteration step t and $vl_t$ represents an estimate of the second order moment for the base time constant at the iteration step t. $ms_t$ and $vs_t$ represent estimates of the first and second order moments for the additional time constant. Initial estimates of the first and second order moments with the base and additional different time constants $ml_0$, $vl_0$, $ms_0$ and $vs_0$ are initialized to zero (more precisely, a vector of zeros) at lines 070, 090, 110, and 120 of the pseudo code shown in FIG. 4. The iteration step t is also initialized to zero at the line 060.

At step S102, the processing unit may determine, by the model training module 130, whether the training process ends or not. In response to determining that the training process does not end at the step S102, the process may proceed to step S103 and perform an iteration of steps S103-S108. When the input data 102 is given in a streaming manner, the training process continues until no new data comes or until an explicit instruction to end the training process is received. In the pseudo code shown in FIG. 4, a while loop of lines 130-230 corresponds to the loop from step S102 to step 108. As can be appreciated, the pseudo code shown in FIG. 4 is described as continuing the training process until the model parameter vector p converges for convenience even though the process of FIG. 3 has been described as continuing until no new data comes or until an explicit end instruction is received.

At step S103, the processing unit may obtain, by the model training module 130, a new training example (x, y) where x denotes a feature vector and y denotes an observed outcome as the correct information. It is contemplated that the new training example may be given as a single data point (pure SGD) or a group of predetermined data points or a subset (mini-batch SGD).

At step S104, the processing unit may calculate, by the gradient calculation submodule 134, a stochastic gradient $g_t$ of the objective function $f$(p) at the current iteration step t using a training example (x, y) of the training data. The stochastic gradient $g_t$ is a set of partial derivatives of the objective function $f$(p), each of which is the derivative with respect to one variable corresponding to one element of the model parameter vector p. The objective function $f$(p) may be the average of the loss function $\{y-G(x; p)\}^2$. In the pseudo code shown in FIG. 4, line 150 corresponds to step S104. It is envisioned that the stochastic gradient $g_t$ may be calculated for the single data point (or a sample) or the group of the predetermined data points (or a mini-batch).

At step S105, the processing unit may update, by the first and second order moment estimation submodules 136,142, estimates of the first and second order moments for both the base and additional time constants, $ml_t$, $vl_t$, $ms_t$ and $vs_t$. In the pseudo code shown in FIG. 4, lines 160-190 correspond to step S105. As can be appreciated, $g_t^2$ indicates an element-wise square of the stochastic gradient $g_t$. Lines 160-190 of the pseudo code shown in FIG. 4 instruct the computer to compute an exponentially moving average of the stochastic gradient and the squared stochastic gradient for the base and additional time constants (or decay rates). It is contemplated that the way of calculating the estimate of the moment may be the same for the base and additional time constants, except that the decay rates are different.

In steps S106-S108, the processing unit may update, by the parameter update submodule 148, the model parameter vector p based on the estimates of the first and second order moments with the base and additional time constants, $ml_t$, $vl_t$, $ms_t$ and $vs_t$. Each element of the model parameter vector p is updated by the moving average of the stochastic gradient adjusted by the moving average of the squared stochastic gradient depending on inconsistencies between two estimates of the first order moment $ml_t$, $ms_t$ in a component corresponding to the element and magnitude relationship between the two estimates of the second order moment $vl_t$, $vs_t$ in the corresponding component.

At step S106, the processing unit may compute, by the parameter update submodule 148, a final estimate of the first order moment based on the estimates of the first order moment for the base and additional (long-term and short-term) time constants, $ml_t$, $ms_t$. In the pseudo code shown in FIG. 4, a line 200 corresponds to step S106. The final estimate of the first order moment at the current iteration step, $M_t$, may be calculated as follows:

$$M_t = I(ml_t \circ ms_t > 0) \circ H\left(\frac{ml_t}{1-bl_1^t}, \frac{ms_t}{1-bs_1^t}\right).$$

where I(A) denotes an indicator function that returns 1 if the condition A is true and returns 0 otherwise, ° (a circle operator) represents an elementwise product or Hadamard Product, and H(a,b) denotes an elementwise operator of vectors a and b.

The function H(a, b) may be defined as follows:

$$H(a,b) \triangleq \frac{(a+b)}{2} \text{ (arithmetic mean)},$$

$$H(a,b) \triangleq \sqrt{ab} \text{(geometric mean), or}$$

$$H(a,b) \triangleq \sin(a)\min(|a|,|b|),$$

where all operators (addition, division, multiplication, square root, sin function, min function, absolute value function) represent elementwise operations of the vectors a and b.

As can be appreciated, the vector $ml_t/(1-bl_1^t)$ and the vector $ms_t/(1-bs_1^t)$ in the function H represent bias-corrected estimates of the first order moment with base and additional time constants, respectively. In embodiments, the bias correction is performed to counteract the initialization bias of the estimates of the moments where the estimates are initialized to a vector of zeros. Their denominators asymptotically approach 1 over time and hence the bias-corrected estimates are approximately equivalent to the biased estimates of the first order moment with a large t. Although generally described as being performed, it is contemplated that bias correction may be omitted.

The final estimate of the first order moment $M_t$ is calculated by the elementwise product (e.g., Hadamard product) of the indicator function I and the elementwise operator function H. The final estimate of the first order moment $M_t$ has an element that is set to zero (in embodiments, a very small value near zero may also be contemplated) when the two estimates of the first order moment, $ml_t$ and $ms_t$, are inconsistent in the corresponding component based on the indicator function I. Otherwise, the element of the final estimate of the first order moment $M_t$ is set to a value generated by combining the corresponding components of the two estimates of the first order moment, $ml_t$ and $ms_t$, using the elementwise operator function H.

FIG. 5 shows a schematic illustrating a method for updating the model parameters using plural moment estimates with both long and short-term time constants. FIG. 5 shows a contour plot of an objective function in a 2-dimensional parameter space and in embodiments the model parameters include two parameters px and py. In FIG. 5, a dashed line schematically represents a trajectory of the model parameters 152 that develops during the training process, a solid arrow represents an estimate of the first order moment (or the moving average of the stochastic gradient) for the short-term time constant, a dashed arrow represents an estimate of the first order moment for the long-term time constant, and a bold arrow represents a final estimate of the first order moment.

As shown in FIG. 5, the model parameters 152 are expected to approach to an optimum solution (an error minimum point) as the training progresses. In the trajectory shown in FIG. 5, two points $(px_i, py_i)$ and $(px_j, py_j)$ are picked up. For the first point $(px_i, py_i)$, two estimates of the first order moment with long- and short-term time constants are consistent in both px and py components. In this manner, the vector of the final estimate represented by the bold arrow has values of the components px, py, each of which is generated by combining respective components of the two estimates of the first order moment (e.g., an average).

However, for the second point $(px_j, py_j)$, two estimates of the first order moment with long- and short-term time constants are inconsistent in the py component. In this manner, one estimate is positive and the other estimate is negative. As a result, the component of the final estimate corresponding to the parameter py is set to zero and the vector of the final estimate represented by the bold arrow has a new value (e.g., average) for only the component px.

In embodiments, the use of three or more time constants for the first order moment may also be utilized. In one non-limiting embodiment where three or more time constants are employed, a conservative rule may assign zero to a component of the final estimate if any of corresponding components of the plural estimates is inconsistent. A more relaxed rule may assign non-zero value when the majority of the corresponding components of the plural estimates are consistent and even if a few corresponding components has inconsistency.

Referring again to FIG. 3, at step S107, the processing unit may further compute, by the parameter update submodule 148, a final estimate of the second order moment based on the estimates of the second order moment of the long and short-term time constants $vl_t$, $vs_t$. In the pseudo code shown in FIG. 4, line 210 corresponds to step S107. The final estimate of the second order moment at the current iteration step, $V_t$, may be calculated as follows:

$$V_t = \max\left(\frac{vl_t}{1-bl_2^t}, \frac{vs_t}{1-bs_2^t}\right).$$

where max represents an elementwise operation.

In embodiments, the final estimate of the second order moment $V_t$ is calculated as a vector having a maximum of respective components of the two estimates of the second order moment. Instead of employing a magnitude relationship such as a maximum, an arithmetic mean or a geometric mean of the components is also be contemplated. In embodiments where three or more time constants are used for the second order moment, a maximum or average of the three or more estimates may be employed.

At step S108, the processing unit may update, by the parameter update submodule 148, the current values of the model parameters 152 based on the final estimates of the first and second order moments $M_t$ and $V_t$ according to an update rule expressed as follows:

$$p_t \leftarrow p_{t-1} - r \cdot \frac{M_t}{\sqrt{V_t} + e}$$

where e denotes generally a very small value (e.g. $10^{-8}$), which is added to avoid dividing by zero.

As described hereinabove with respect to the update rule, the final estimate of the first order moment $M_t$ represents a gradient vector pointing in the direction of the gradient and a reciprocal of the final estimate of the second order moment $V_t$ works as a sensitivity that serves to scale individual learning rates for the model parameters p based on the base learning rate r.

As described herein, the final estimate of the first order moment $M_t$ has an element that is set to zero when the corresponding components of the two estimates of the first order moment $ml_t$ and $ms_t$ are inconsistent. As can be appreciated, the update rule does not change uncertain parameters, keeping the current state, so the manner of the parameter update is conservative.

In embodiments where a component of the estimates of the second order moment Vt becomes large, an individual learning rate for a parameter corresponding to the component becomes small. Since the final estimate of the second order moment $V_t$ is calculated as a vector having a maximum of respective components of the two estimates of the second order moment, a smaller learning rate is selected for each model parameter so the manner of the parameter update is conservative.

After the parameter update at step S108, the process may loop back to step S102. In response to no new data being obtained or in response to an explicit instruction to end the training process being received, the process may branch to step S109. At step S109, the processing unit may return final optimized values of the model parameters 152 of the prediction model 150 and the process ends at step S110.

According to embodiments of the present disclosure, computer-implemented methods, computer systems and computer program products for training a model that is capable of fast learning without degrading stability of learning process are provided.

As can be appreciated, the moment of the stochastic gradient has a dependency on the current values of the model parameters. Thus, the moment of the stochastic gradient changes as the training progresses. Generally, the current estimate of the moment contains past estimates based on the old parameters, and therefore, the moment tends to be biased toward the past estimation. Thus, it is helpful to properly adjust rates at which the training process forgets past estimations.

As can be appreciated, by taking at least two estimates of the moment of the stochastic gradient with at least two different time constants, (which describe rates at which the past estimates are forgotten, into account in model parameter updates) the risk of big mistakes in gradient estimation due to the influence of the old model parameters can be reduced. As such, fast learning may be performed without degrading the stability of the learning process.

Although one or more embodiments have been described herein as being variations of a specific variant of SGD, it is contemplated that the moment estimation can be performed using a variety of other techniques. In embodiments of the variants of the SGD with moment estimation may include stochastic gradient descent with momentum and RMSProp (Root Mean Square Propagation), etc. It is envisioned that the moment estimation and parameter update techniques according to the embodiments described herein may be applicable to any techniques as long as the moment estimation is performed to train the model. In this manner, conventional moment estimation may be replaced with the moment estimation technique described herein and the conventional parameter update rule may be replaced with the parameter update rule that takes the at least two estimates of the moment of the stochastic gradient with different time constants into account described herein.

Although the advantages obtained with respect to the embodiments according to the present invention have been described, it should be understood that some embodiments may not have these potential advantages, and these potential advantages are not necessarily required of all embodiments.

Figure 6:
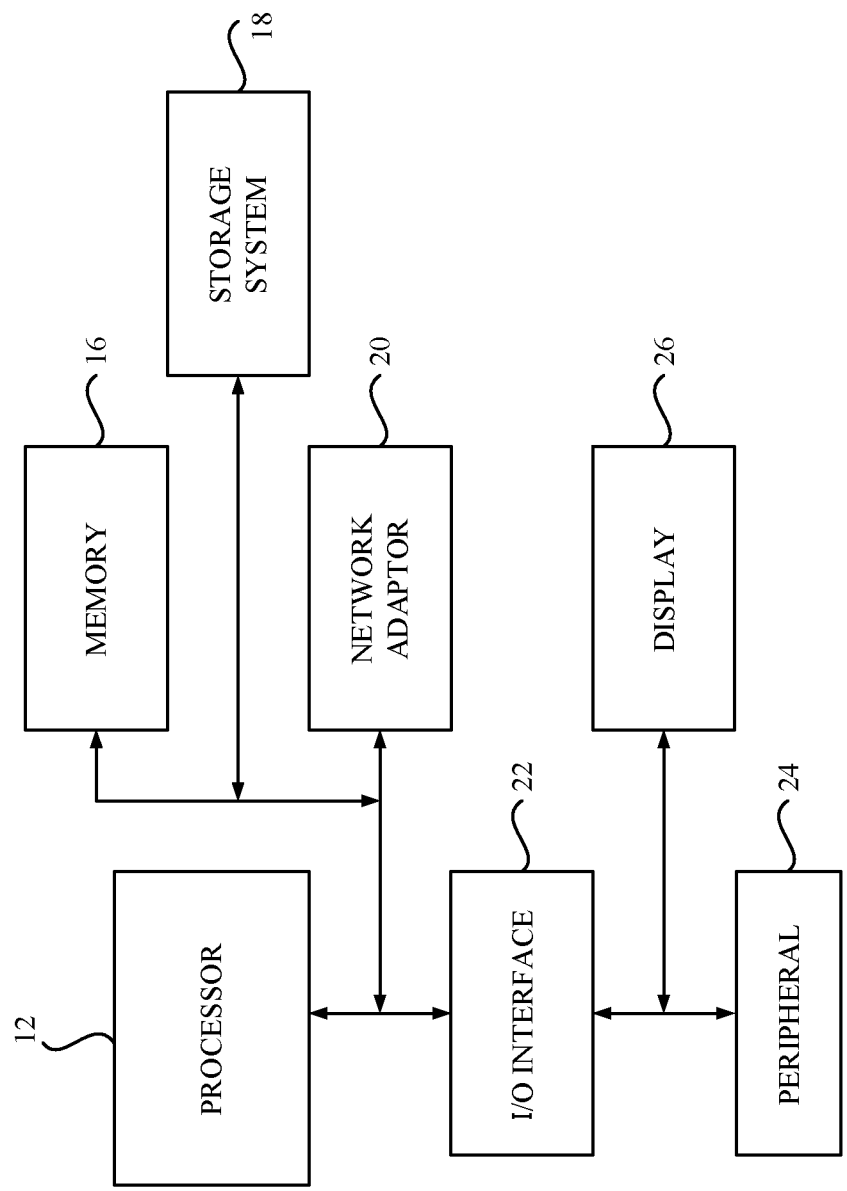
FIG. 6 depicts a schematic of a computer system according to an embodiment of the present invention.

Referring now to FIG. 6, a schematic of an example of a computer system 10, which can be used for the forecasting system 100, is shown. In embodiments, the computer system 10 is implemented as computer system. As can be appreciated, the computer system 10 is only one example of a suitable processing device and is not intended to suggest any limitation as to the scope of use or functionality of embodiments of the invention described herein. As such, the computer system 10 is configured to implement and/or perform any of the functionality set forth hereinabove.

In embodiments, the computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, hand-held or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

The computer system 10 is illustrated in FIG. 6 in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

In embodiments, the computer system 10 may include a variety of computer system readable media. It is contemplated that such media may be any available media that is accessible by the computer system 10, and it includes both volatile and non-volatile media and removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described hereinbelow, the storage system 18 may include at least one program product having a set (e.g., at least one) of program modules that are configured to carry out the functions of embodiments of the invention described herein.

The program/utility, having a set (e.g., at least one) of program modules, may, in one non-limiting embodiment, be stored in the storage system 18 as well as an operating system, one or more application programs, other program modules, and program data. Each of the operating system, one or more application programs, other program modules, and program data or some combination thereof, may include an implementation of a networking environment. As can be appreciated, the program modules are configured to carry out the functions and/or methodologies of embodiments of the invention as described herein.

In embodiments, the computer system 10 may also communicate with one or more peripherals 24 such as a keyboard, a pointing device, a car navigation system, an audio system, etc., a display 26, one or more devices that enable a user to interact with the computer system 10, and/or any devices (e.g., network card, modem, etc.) that enables the computer system 10 to communicate with one or more other computing devices. It is contemplated that such communication can occur via Input/Output (I/O) interfaces 22. In embodiments, the computer system 10 can communicate with one or more networks such as a local area network (LAN), a general wide area network (WAN), and/or a public network (e.g., the Internet) via the network adapter 20. In one non-limiting embodiment, the network adapter 20 communicates with the other components of the computer system 10 via a bus. Although not shown, it is envisioned that other hardware and/or software components could be used in conjunction with the computer system 10, such as microcode, device drivers, redundant processing units, external disk drive arrays, RAID systems, tape drives, and data archival storage systems, etc.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used herein, specify the presence of stated features, steps, layers, elements, and/or components, but do not preclude the presence or addition of one or more other features, steps, layers, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for training a model, comprising:
    obtaining a single training example from a training dataset including a plurality of training examples for a model having model parameters stored on one or more computer readable storage mediums operably coupled to the hardware processor, the training example including an outcome and features to explain the outcome, the training example being randomly selected from the training dataset;
    calculating a gradient with respect to the model parameters of the model using the training example;
    computing at least two estimates of a moment of the gradient with at least two different time constants for the same type of the moment using the gradient; and
    updating, using a hardware processor, the model parameters of the model using the at least two estimates of the moment with the at least two different time constants to reduce errors while calculating the at least two estimates of the moment of the gradient.

2. The method of claim 1, wherein each of the model parameters is updated with an amount determined individually by respective components of the at least two estimates of the moment.

3. The method of claim 2, wherein a first model parameter of the model is updated by lesser amount than a second model parameter in response to the at least two estimates of the moment that is not fitting a component corresponding to the first model parameter.

4. The method of claim 3, wherein, in response to the at least two estimates of the moment is matching the component corresponding to the first model parameter, the first model parameter is updated according to a value generated by combining respective components of the at least two estimates of the moment corresponding to the first model parameter.

5. The method of claim 2, wherein a first model parameter of the model is updated according to a maximum or a mean of components of the at least two estimates of the moment corresponding to the first model parameter.

6. The method of claim 1, wherein the moment includes a first order moment and a second order moment as different types, wherein the first order moment represents average of the gradient and the second order moment scales individual learning rates for the model parameters of the model.

7. The method of claim 1, wherein the moment includes a first order moment and a second order moment as different types and a first model parameter of the model is updated in a manner depending on inconsistencies between at least two estimates of the first order moment in a component corresponding to the first model parameter and magnitude relationship between at least two estimates of the second order moment in the component.

8. The method of claim 1, wherein the time constants change exponential decay rates for moment estimation and the time constants include a first time constant and a second time constant that is larger or smaller than the first time constant.

9. The method of claim 1, wherein calculating the gradient, computing the at least two estimates of the moment, and updating the model parameters are iteratively performed in response to a new training example.

10. The method of claim 1, wherein the training example is provided in a sequential manner, wherein the model to be trained is updated each time a new training example arrives and the model is used to predict a value of the outcome based on input features.

11. The method of claim 10, wherein the input features include a plurality of elements representing past value fluctuations of the outcome observed over a predetermined period.

12. The method of claim 10, wherein the input features include a plurality of elements related to the outcome.

13. The method of claim 1, wherein the gradient is a stochastic gradient of an objective function at an iteration step, wherein the objective function evaluates a loss between the outcome in the training example and a prediction done by the model with current values of the model parameters from the features in the training example and the training example includes a single training example or a group of training examples.

14. A computer system for training a model by executing program instructions, the computer system comprising:
one or more computer readable storage mediums for storing the program instructions and a training example for a model having model parameters; and
processing circuitry in communication with the memory for executing the program instructions, wherein the processing circuitry is configured to:
obtain a single training example from a training dataset including a plurality of training examples for a model having model parameters from the one or more computer readable storage mediums, wherein the training example includes an outcome and features to explain the outcome, the training example being randomly selected from the training dataset;
calculate a gradient with respect to the model parameters of the model using the training example;
compute at least two estimates of a moment with at least two different time constants for the same type of the moment using the gradient; and
update the model parameters of the model using the at least two estimates of the moment with the at least two different time constants to reduce errors while calculating the at least two estimates of the moment of the gradient.

15. The computer system of claim 14, wherein the processing circuitry is configured to update each of the model parameters with an amount determined individually by respective components of the at least two estimates of the moment.

16. The computer system of claim 15, wherein the processing circuitry is configured to update a first model parameter of the model by lesser amount than a second model parameter in response to the at least two estimates of the moment that is not fitting a component corresponding to the first model parameter and in response to the at least two estimates of the moment being consistent in the component corresponding to the first model parameter, wherein the first model parameter is updated according to a value generated by combining respective components of the at least two estimates of the moment corresponding to the first model parameter.

17. The computer system of claim 15, wherein the processing circuitry is configured to update a first model parameter of the model according to a maximum or a mean of components of the at least two estimates of the moment corresponding to the first model parameter.

18. The computer system of claim 14, wherein the moment includes a first order moment of the gradient and a second order moment of the gradient as different types, wherein the first order moment represents average of the gradient and the second order moment scales individual learning rates for the model parameters of the model.

19. The computer system of claim 14, wherein the moment includes a first order moment and a second order moment as different types and a first model parameter of the model is updated in a manner depending on inconsistency between at least two estimates of the first order moment in a component corresponding to the first model parameter and a magnitude relationship between at least two estimates of the second order moment in the component.

20. A computer program product for training a model, comprising:
a computer readable storage medium having program instructions and training examples for models having model parameters embodied therewith, the program instructions executable by a computer to cause the computer to perform a computer-implemented method comprising:
obtaining a single training example from a training dataset including a plurality of training examples for a model having model parameters from the computer readable storage medium, the training example including an outcome and features to explain the outcome, the train example being randomly selected from the training dataset;
calculating a gradient with respect to the model parameters of the model using the training example;
computing at least two estimates of a moment of the gradient with at least two different time constants for the same type of the moment using the gradient; and
updating the model parameters of the model using the at least two estimates of the moment with the at least two different time constants to reduce errors while calculating the at least two estimates of the moment of the gradient.

21. The computer program product of claim 20, wherein the computer is configured to update each of the model parameters with an amount determined individually by respective components of the at least two estimates of the moment.

22. The computer program product of claim 21, wherein the computer is configured to update a first model parameter of the model according to a maximum or a mean of components of the at least two estimates of the moment corresponding to the first model parameter.

23. The computer program product of claim 21, wherein the moment includes a first order moment and a second order moment as different types, wherein the first order moment represents an average of the gradient and the second order moment scales individual learning rates for the model parameters of the model.

24. The computer program product of claim 20, wherein the computer is configured to update a first model parameter of the model by lesser amount than a second model parameter in response to the at least two estimates of the moment that is not fitting a component corresponding to the first model parameter, wherein in response to the at least two estimates of the moment being consistent in the component corresponding to the first model parameter, the first model parameter is updated according to a value generated by combining respective components of the at least two estimates of the moment corresponding to the first model parameter.

25. The computer program product of claim 20, wherein the moment includes a first order moment and a second order moment as different types and a first model parameter of the model is updated in a manner depending on inconsistencies between at least two estimates of the first order moment in a component corresponding to the first model parameter and a magnitude relationship between at least two estimates of the second order moment in the component.

\* \* \* \* \*